United States Patent [19]

Ito et al.

[11] 3,723,580

[45] Mar. 27, 1973

[54] CONTINUOUS PROCESS FOR MANUFACTURING O,O-DIALKYL-CHLOROTHIOPHOSPHATE

[75] Inventors: Ken Ito, Toyonaka; Shinichiro Terao, Ashiya; Hirotaka Sugahara, Toyonaka; Takashi Yamada, Nishinomiya; Iwao Dohgane, Nishinomiya; Takashi Chinuki, Toyonaka; Hiroshi Yoshitake, Minoo; Hidekazu Fujino, Moriguchi, all of Japan

[73] Assignee: Sumitomo Chemical Company, Ltd., Osaka, Japan

[22] Filed: May 18, 1970

[21] Appl. No.: 38,309

[52] U.S. Cl. ................................................. 260/974
[51] Int. Cl. ........................................... C07f 9/20
[58] Field of Search ................................... 260/974

[56] References Cited

UNITED STATES PATENTS

| | | | |
|---|---|---|---|
| 3,574,798 | 4/1971 | Hazy et al. | 260/974 X |
| 3,051,739 | 8/1962 | Gould | 260/974 |

FOREIGN PATENTS OR APPLICATIONS 720,393    10/1965    Canada ........................... 260/974

*Primary Examiner*—Lewis Gotts
*Assistant Examiner*—Richard L. Raymond
*Attorney*—Stevens, Davis, Miller & Mosher

[57] ABSTRACT

O,O- is continuously prepared in high yield from phosphorus sulfochloride and sodium lower-alcoholate by continuously supplying to a reaction system 2.0 to 2.3 parts by mole of sodium low-alcoholate in a form of a lower alcohol solution, on the basis of one part by mole of phosphorus sulfochloride, along the direction of stream in a divisional manner in 3 to 8 fractions, substantially smaller amounts of the fractions being supplied thereto towards the downstream side of the reaction system, while effecting stirring of the reaction system, keeping an average residence time of reacting solution in the entire system within 6 hours and the temperature of the reaction system at 30°C or less. O,O-di-lower-alkyl-chlorothiophosphate is an intermediate for agricultural chemicals of organic phosphorus series or for lubricants or stabilizers.

3 Claims, 2 Drawing Figures

CONTINUOUS PROCESS FOR MANUFACTURING O,O-DIALKYL-CHLOROTHIOPHOSPHATE

This invention relates to a process for producing 0,0-di-lower-alkylchlorothiophosphate by continuously reacting phosphorus sulfochloride with sodium lower-alcoholate, and more particularly to a process for continuously preparing 0,0-di-lower-alkylchlorothiophosphate from phosphorus sulfochloride and sodium lower-alcoholate, which comprises continuously supplying to a reaction system containing phosphorus sulfochloride 2.0 to 2.3 parts by mole of sodium lower-alcoholate in a form of a lower-alcohol solution, on the basis of one part by mole of phosphorus sulfochloride, along the direction of stream in a divisional manner in 3 to 8 fractions, substantially smaller amounts of the fractions being supplied thereto towards the downstream side of the reaction system, while effecting stirring of the reaction system, keeping an average residence time of reacting solution in the entire reaction system within 6 hours and the temperature of the reaction system at 30° C or less.

It is an object of the present invention to provide a process for producing 0,0-di-lower-alkylchlorothiophosphate in an industrially advantageous manner. The lower alcohol herein referred to means aliphatic alcohols having one to four carbon atoms.

0,0-di-lower-alkylchlorothiophosphate is widely used as intermediates for agricultural chemicals of organic phosphorus series such as 0,0-dimethyl-0-(4-nitrophenyl) thiophosphate, 0,0-dimethyl-0-(3-methyl-4-nitrophenyl) thiophosphate, 0,0-diethyl-0-(4-nitrophenyl) thiophosphate, etc., or for lubricants or stabilizers. Thus, 0,0-di-lower-alkylchlorothiophosphate is a very important compound.

Heretofore, 0,0-di-lower-alkylchlorothiophosphate has been produced according to various processes, but there have been brought about various problems, owing to an increase in production capacity due to the increasing demand. For example, even in a process for producing 0,0-di-lower-alkylchlorothiophosphate by firstly preparing 0,0-di-lower-alkyldithiophosphate from diphosphorus pentasulfide and lower alcohol and then subjecting it to action with chlorine, etc., which is now widely carried out in an industrial scale, many reaction steps are required according to the increase in the production capacity and further complicated reaction operations must be carried out. Thus, said process has various important problems.

Further, in said process, solid raw materials, for example, diphosphorus pentasulfide, etc. must be used or many steps are necessary for carrying out the operation and its reaction operation itself is very complicated. Consequently, it is very hard to produce 0,0-di-lower-alkylchlorothiophosphate continuously.

In other processes than the foregoing process, now in practice, there are many drawbacks due to the increase in the production capacity, which are a very important problem for carrying out the processes.

Under these circumstanses, the present inventors have studied a process for producing 0,0-di-lower-alkylchlorothiophosphate in an industrially advantageous manner in a large scale. That is, the present inventors assumed that production of 0,0-di-lower-alkylchlorothiophosphate could be effected simply in one stage by reacting sodium lower-alcoholate in a solution state of lower alcohol with phosphorus sulfochloride and was suitable for a large-scale production from the viewpoint of raw materials, as will be explained below:

Phosphorus sulfochloride can be very simply prepared at a low cost in mass production scale by reacting sulfur with phosphorus trichloride in the presence of such a catalyst as anhydrous aluminum chloride, and also a lower-alcohol solution of sodium low-alcoholate by deamalgamating sodium amalgam formed by electrolysis of sodium chloride, with lower alcohol.

The present inventors encountered the following difficult problem, when a process for producing 0,0-di-lower-alkylchlorothiophosphate from said phosphorus sulfochloride and a lower-alcohol solution of sodium lower-alcoholate solution was carried out.

Firstly, when the reaction temperature was higher than 30 °C, there took place reactions between the formed 0,0-di-lower-alkylchlorothiophosphate and solvent alcohol, etc., and as a result the yield of 0,0-di-lower-alkylchlorothiophosphate was considerably lowered. Furthermore, hydrogen chloride, lower-alkyl chloride, etc. were liable to be formed. Furthermore, when the reaction was carried out over a period of more than 6 hours, even while keeping the reaction temperature at 30°C or less, similar phenomena appeared as in the case of the higher reaction temperature.

Secondly, a large amount of heat was released in the reaction. That is, a heat release amounting to about 70 to about 90 kcal per mole of 0,0-di-lower-alkylchlorothiophosphate was observed. Furthermore, the reaction between the phosphorus sulfochloride and the lower alcoholate took place almost instantaneously when they came in contact with each other.

It was presumable that the amount of heat release per unit time could be repressed by lowering a feeding speed of phosphorus sulfochloride to the lower-alcoholate solution to avoid the temperature elevation by the heat release, but such phenomena as decrease in yield were liable to take place, when the reaction time was prolonged, as explained above. Therefore, it was impossible to carry out the reaction batch-wise in an industrial scale on account of both time and temperature restrictions, except in a small laboratory scale.

The present inventors tried to obtain 0,0-di-lower-alkylchlorothiophosphate continuously by restricting the reaction temperature and reaction time to said specific ones, but failed to efficiently obtain the desired 0,0-di-lower-alkylchlorothiophosphate, because the following reactions took place in parallel only by the restriction of the reaction temperature and reaction time and considerable amounts of other by-products than the desired one, for example, 0-lower-alkyldichlorothiophosphate or 0,0,0-tri-lower-alkylthiophosphate, were produced together:

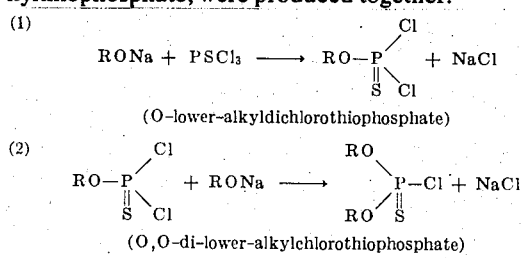

(3) 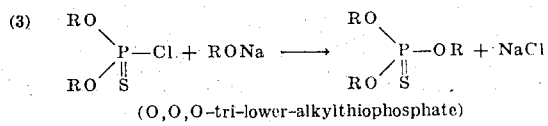

(O,O,O-tri-lower-alkylthiophosphate)

wherein R represents a lower alkyl group.

Consequently, the present inventors proceeded with further studies on a process for producing 0,0-di-lower-alkylchlorothiophosphate selectively in good yield from phosphorus sulfochloride and the lower-alcoholate solution in a continuous manner, and finally succeeded in producing the desired 0,0-di-lower-alkylchlorothiophosphate in an industrially advantageous manner by continuously supplying to a reaction system 2.0 to 2.3 parts by mole of sodium lower-alcoholate in a form of lower-alcohol solution, on the basis of one part by mole of phosphorus sulfochloride, along the direction of stream in a divisional manner in 3 to 8 fractions, substantially smaller amounts of the fractions being to be supplied thereto towards the downstream side of the reaction system by means of an apparatus of the type as shown in FIG. 1 or 2, while keeping an average residence time in the entire reaction system within 6 hours and a temperature of the reaction system at 30° C or less.

Now, the present invention will be explained, referring to the accompanying drawings.

Figure 1:
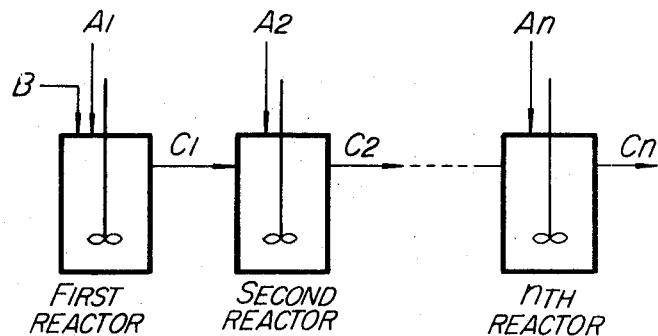
FIG. 1 shows an apparatus for carrying out the present invention.

In FIG. 1, a continuous reaction apparatus consists of $n$ reactors ($3 \leq n \leq 8$), and each reactor is provided with a stirrer, a feed pipe $A_1, A_2$ ... or $An$ for the lower-alcoholate solution and an overflow pipe $C_1, C_2$ ... or $Cn$ for the reaction solution. Furthermore, a feed pipe B for phosphorus sulfochloride is provided at the first reactor. The reaction proceeds by the reaction of phosphorus sulfochloride supplied from B with the lower-alcoholate supplied from $A_1 - A_n$ in the respective reactors with stirring, and the solution leaves the reaction system through the overflow pipe at the $n$th reactor after the completion of the reaction.

Figure 2:
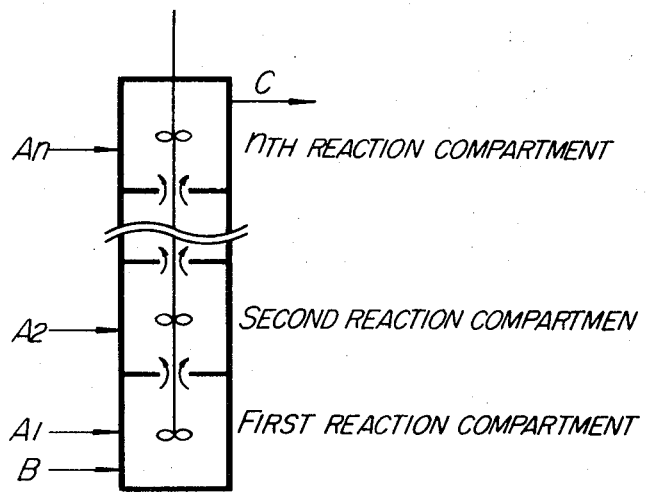
FIG. 2 shows another apparatus for carrying out the present invention.

In FIG. 2, a reaction column is divided to $n$ reaction compartments ($3 \leq n \leq 8$) by partition walls, and each reaction compartment is provided with a stirrer and a feed pipe $A_1, A_2$ ... or $An$ for the lower-alcoholate. The phosphorus sulfochloride is supplied from the feed pipe B for the phosphorus sulfochloride into the lowest first reaction compartment and reacts with the lower-alcoholate successively supplied to each reaction compartment through the feed pipe $A_1, A_2$ ... or $An$, with stirring and the reaction product finally leaves the reaction system from the highest $n$th reaction compartment through an overflow pipe C.

In order to remove the heat of reaction, each reactor or reaction compartment of FIGS. 1 and 2, is cooled from the outside, but when the heat of reaction cannot be removed sufficiently by such means, each reactor or reaction compartment is connected to a heat exchanger provided outside the reaction system, if necessary. Thus, the heat can be readily removed even in a large scale production scale.

The most important feature of the present invention is to supply the lower-alcoholate solution to the reaction system in a divisional manner in 3 to 8 fractions, so that the amounts of the fractions may be substantially decreased towards the downstream side of the reaction system. That is to say, when the lower-alcoholate solution is supplied to the reaction system with no division or with two fractions so that the amount of the fractional solution to be fed at the downstream side may be smaller than that to be fed at the upstream side in carrying out the reaction continuously, a product distribution becomes broader, and a large amount of 0-lower-alkyldichlorothiophosphate or 0,0,0-tri-lower-alkylthiophosphate is produced as by-product at the same time. On the other hand, when the lower-alcoholate solution is supplied to the reaction system with 3 to 8 fractions so that the amounts of the fractional solutions to be fed at the downstream side may be substantially smaller than that to be fed at the upstream side of the reaction system, as in the present invention, the amount of 0-lower-alkyldichlorothiophosphate or 0,0,0-tri-lower-alkylthiophosphate is surprisingly reduced and 0,0-dialkylchlorothiophosphate can be obtained in high yield.

However, even if the lower-alcoholate solution is supplied to the reaction system in much more fractions, that is, 9 or more fractions, no remarkable effect can be obtained. On the contrary, the apparatus becomes more complicated and industrially disadvantageous. That is, when the lower-alcoholate solution is supplied to the reaction system in 3 to 8 fractions, so that the amounts of the fractions to be supplied at the downstream side may be substantially smaller than those at the upstream side, said remarkable effect can be obtained. Usually, 4 to 6 fractions are preferable.

In supplying the lower-alcoholate solution in 3 to 8 fractions, it is important to supply it so that the amounts of the fractional solutions may be smaller towards the downstream side, and 0,0-di-lower-alkylchlorothiophosphate can be thereby obtained only in high yield. For example, 0,0-di-lower-alkylchlorothiophosphate can be obtained in considerably high yield by supplying the lower-alcoholate solution to the first reactor or reaction compartment and successive ones in such fractions as 5 parts, 3 parts, 1 part, 0.6 part and 0.4 part, as compared with the yield obtained when the solution is supplied thereto in equal amounts of five fractions. Such is an unexpected effect of the present invention.

When the equal amounts of the lower-alcoholate solution are supplied to the reaction system and the same effect as obtained when substantially smaller amounts of the fractions are supplied towards the downstream side of the reaction system is thereby aimed to obtain, the lower-alcoholate solution must be supplied to the reaction system in so many fractions, and as a result, the apparatus cost becomes expensive and the operation also becomes very complicated. Thus, it is not industrially advantageous to supply the lower-alcoholate solution to the reaction system in equal amounts of fractions.

In carrying out the present invention, it is possible to supply to the first reactor or reaction compartment more than a half of the total amount of the lower-alcoholate solution, and no significance is observed almost at all even by further division of the amount of the lower-alcoholate solution to be supplied to the first reactor or reaction compartment.

It is necessary to use 2.0 to 2.3 parts by mole of sodium lower-alcoholate, preferably 2.1 to 2.3 parts by mole thereof, per one part by mole of phosphorus sulfochloride. When less than 2.0 parts by mole of sodium lower-alcoholate is used, a large amount of 0-lower-alkyldichlorothiophosphate is formed. On the other hand, where more than 2.3 parts by mole of sodium lower-alcoholate is used, a large amount of 0,0,0-tri-lower-alkyl is formed. That is, the yield of 0,0-di-lower-alkylchlorothiophosphate is lowered. There is none of specific limitation to the concentration of the lower-alcoholate solution.

Phosphorus sulfochloride is supplied to the reaction system alone or in a solution form of a solvent inactive to the reaction, for example, toluene or benzene. The substance inactive to the reaction, that is, toluene or benzene, can be supplied to the reaction system independently without any trouble. The starting materials, that is, phosphorus sulfochloride and the lower-alcoholate solution, are all in the liquid state, and thus can be readily as well as quantitatively supplied to the reaction system. This is an advantageous feature of the present invention.

When the reaction temperature is higher, side reactions with the lower-alcohol, etc. are liable to take place and the yield of 0,0-di-lower-alkylchlorothiophosphate is thereby lowered. Thus, it is necessary to keep the reaction temperature at 30° C or less, preferably 20° C or less. However, it is not necessary to keep all the temperatures of the reactor or reaction compartments equal. That is, a proper temperature at no more than 30°C are only selected for each reactor or reaction compartment. Furthermore, it is necessary to keep sum total of average residence times in the reactors or reaction compartments, that is, the residence time in the entire reaction system, within 6 hours. If the sum total of the average residence times exceeds 6 hours, the yield of 0,0-di-lower-alkylchlorothiophosphate is liable to be lowered by the side reaction. However, there is none of specific limitation to an average residence time of the reaction mixture in each reactor or reaction compartment, and the sum total of the residence times, that is, the residence time in the entire reaction system, is only kept within 6 hours. Thus, the average residence time of each reactor or reaction compartment can be properly selected, in view of the amount of heat released, etc.

Furthermore, it is necessary to efficiently effect stirring in each reactor or reaction compartment to carry out the reaction smoothly. Sodium chloride is deposited in the reaction mixture by the reaction, but can be dispersed uniformly in the mixture with efficient stirring, since the sodium chloride is thereby converted to fine particles having sizes of about 2 to 3 microns. Thus, sodium chloride does not cling to the reactor wall and gives no trouble to the reaction. This makes the present invention more industrially advantageous. That is, when a reaction system is not in a mere liquid phase, but in a state where fine solid particles are deposited, and further the reaction releases heat and a reactor must be cooled from the outside to remove the generated heat, as in the present invention, the particles generally have a tendency to cling to and build up on the reactor wall during a long period of operation. Thus, the heat conductance is thereby made poor, and finally the removal of the heat of reaction is often made impossible. Accordingly, the solution of such problems is very important when the reaction is carried out continuously in an industrial scale. According to the present invention, the formed sodium chloride has a good flowability, as explained above, and does not cling to the reactor wall even after a long period of operation. Thus, a stable operation can be assured for a long period of time in the present invention without using any special expedient.

In the reaction mixture resulting from said reacting operation and leaving the final reactor or reaction compartment, that is, a lower alcohol in which 0,0-di-lower-alkylchlorothiophosphate as a main component and a small amount of 0-lower-alkyldichlorothiophosphate or 0,0,0-tri-lower-alkylthiophosphate as a by-product, are dissolved (when other solvent such as toluene is used, said solvent is also contained therein), fine particles of sodium chloride formed by the reaction are uniformly dispersed.

The desired 0,0-di-lower-alkylchlorothiophosphate is separated from the reaction mixture according to a proper method. For example, the following method is applicable. The reaction mixture is poured into cold water to dissolve the lower alcohol and sodium chloride in water, and the thus separated oil layer containing 0,0-di-lower-alkylchlorothiophosphate is decanted, dehydrated and distilled. The distillation must be carried out under a reduced pressure with a sufficient carefulness, because 0,0-di-lower-alkylchlorothiophosphate is thermally unstable and is liable to undergo decomposition. Sometimes, the decanted oil layer can be forwarded to the successive reaction step, as it is.

The yield of the thus obtained 0,0-di-lower-alkylchlorothiophosphate is usually 85 to 90 percent, though it depends upon the molar ratio of the starting materials.

As explained above, 0,0-di-lower-alkylchlorothiophosphate and the by-products are unstable and thus it is difficult to effect separation and purification of the by-products. According to the present invention 0,0-di-lower-alkylchlorothiophosphate can be obtained at a high purity by repressing the amount of by-products. Thus, 0,0-di-lower-alkylchlorothiophosphate can be continuously produced in good yield in an industrially advantageous manner and a large production scale from cheap phosphorus sulfochloride and a lower-alcohol solution of sodium lower-alcoholate as starting materials by carrying out the reaction according to the present continuous process, while repressing the amount of by-products. Thus, the present invention has a great significance in this respect.

Now, the present invention will be explained in detail, referring to examples: However, it is not intended to limit the invention.

EXAMPLE 1

A continuous reacting apparatus consisting of five reactors as shown in FIG. 1 was used, wherein the volume ratio of the first to fifth reactors is 3 : 2 : 3 : 1 : 1. With good stirring, 39.9 parts by weight per hour of a toluene solution containing 58.6 percent by weight of phosphorus sulfochloridie and 58.5 parts by weight per hour of a methanol solution of 18.8 percent by weight of sodium methylate were added to the first reactor, and 16.2 parts by weight per hour, 4.4 parts by weight per hour, 2.2 parts by weight per hour and 2.2 parts by weight per hour of a methanol solution containing 18.8 percent by weight of sodium methylate were added at constant rates to the second to fifth reactors, respectively. The molar ratio of sodium methylate to phosphorus sulfochloride was 2.10. The temperature of the reaction mixture was kept at 10° to 20° C. The sum total of the average residence times in the reactors was 44 minutes. When the reaction system reached a sufficiently stationary state, the reaction mixture containing 19.9 parts by weight per hour of 0,0-dimethylchlorothiophosphate left the fifth reactor. In the reaction mixture leaving the fifth column, 2.0 parts by weight per hour of 0,0,0-trimethylthiophosphate and a very small amount of 0-methyl-dichlorothiophosphate were contained as by-products.

The effluent reaction mixture was collected for one hour and poured into a large amount of cold water, and the separated oil layer consisting of toluene, 0,0-dimethylchlorothiophosphate, 0,0,0-trimethylthiophosphate and a very small amount of 0-methyldichlorothiophosphate was dehydrated and distilled, whereby 19.6 parts by weight of 0,0-dimethylchlorothiophosphate were distilled off at 70° to 72°C under a reduced pressure of 20 mmHg. Overall yield of 0,0-dimethylchlorothiophosphate throughout the reaction was 88.4 percent.

The yield of 0,0,0-trimethylthiophosphate as a by-product (percent by mole per phosphorus sulfochloride) was 8 percent, and the yield of 0-methyldichlorothiophosphate as a byproduct was 1 percent or less.

No build-up of sodium chloride onto the reactor wall was observed at all during a continuance of one week of the reaction.

For comparison, the result of the cases where one of specific conditions of the present invention was defective, that is, the case where the methanol solution of sodium methylate was supplied to each reactor in equal amounts of fractions, the case where the sum total of average residence times in the reactors was 9 hours, the case where the molar ratio of sodium methylate to phosphorus sulfochloride was 1.95, the case where the reaction temperature was 40° C and the case where the reaction was carried out in two reactors, and a sodium methylate solution was supplied in two fractions (58.5 parts by weight per hour to the first reactor and 25.0 parts by weight per hour to the second reactor), are shown in Table 1. Other reaction conditions than those mentioned above were the same.

TABLE 1

| | Yield of 0,0-dimethylchloro-thiophosphate | Remarks |
|---|---|---|
| Example 1 | 88.4% | Yield of 0-methyldichlorothiophosphate: 1% or less |
| | | Yield of 0,0,0-trimethylthiophosphate: 8% |
| Sodium methylate solution was supplied in five fractions in equal amounts | 73.0% | Yield of 0-methyldichlorothiophosphate: 8% |
| | | Yield of 0,0,0-trimethylthiophosphate: 17% |
| Sodium methylate solution was supplied in two fractions (58.5 parts by weight per hour to the first reactor and 25.0 parts by weight per hour to the second reactor) | 65.0% | Yield of 0-methyldichlorothiophosphate: 12% |
| | | Yield of 0,0,0-trimethylthiophosphate: 21% |
| Sum total of average residence times was 9 hours | 72.1% | Methyl chloride was produced as a by-product |
| Molar ratio of sodium methylate to phosphorus sulfochloride: 1.95 | 77.9% | A large amount of 0-methyldichlorothiophosphate was produced |
| Reaction temperature: 40°C | 74.7% | Methyl chloride was produced as a by-product |

EXAMPLE 2

The same apparatus as in Example 1 was used, and with efficient stirring, 17.0 parts by weight per hour of phosphorus sulfochloride and 100.1 parts by weight per hour of an ethanol solution containing 10.0 percent by weight of sodium ethylate were supplied to the first reactor, and 28.6 parts by weight per hour, 8.0 parts by weight per hour, 4.0 parts by weight per hour and 2.4 parts by weight per hour of an ethanol solution containing 10.0 percent by weight of sodium ethylate were supplied at constant rates to the second to fifth reactors, respectively. The sum total of the average residence times in the reactors was about 35 minutes. The reaction temperature was kept at 20°C or less. When the reaction system reached a sufficiently stationary state, the reaction mixture containing 16.6 parts per hour of 0,0-diethylchlorothiophosphate left the fifth reactor. No build-up of sodium chloride was observed at all on the reactor wall even after a continuance of one week of the reaction.

For comparison, when the ethanol solution of sodium ethylate was supplied to the reaction system in equal amounts of five fractions, 0,0-diethylchlorothiophosphate contained in the effluent reaction mixture was reduced to 12.9 parts by weight per hour. Further, when the feed rates of the raw materials were reduced to one-fifteenth (the sum total of the average residence times was about 9 hours), the desired 0,0-diethylchlorothiophosphate left the reaction system at a rate of 0.84 part by weight per hour.

When the feed rates of the raw materials were increased to fifteen times as high, the desired 0,0-diethylchlorothiophosphate left the reaction system at a rate of 12.6 parts by weight per hour, which was only 76 percent of the yield of the present invention.

EXAMPLE 3

The same apparatus as in Example 1 was used. With efficient stirring, 8.5 parts by weight per hour of phosphorus sulfochloride and 51.9 parts by weight per hour of an isopropyl alcohol solution containing 10.0 percent by weight of sodium isopropylate were supplied to the first reactor at 10° to 15°C, and 17.3 parts by weight per hour, 8.7 parts by weight per hour, 4.3 parts by weight per hour and 4.3 parts by weight per hour of the same isopropylate solution were supplied to the second to fifth reactors. When the reaction system reached a sufficiently stationary state, a reacting solution containing 9.4 parts by weight per hour of 0,0-diisopropylchlorothiophosphate left the fifth reactor.

EXAMPLE 4

A continuous reacting column consisting of five compartments as shown in FIG. 2 was used, wherein the volume ratio of the first to fifth reaction compartment was 2 : 2 : 1 : 1 : 1. With efficient stirring, quite the same amounts of the same raw materials as were supplied to the first to fifth reactors in Example 1, were supplied to the first to fifth reaction compartments. Sum total of the average residence times was 80 minutes, and the reaction temperature was kept at 20°C or less. When the reaction system reached a sufficiently stationary state, a reaction mixture containing 19.5 parts by weight per hour of 0,0-dimethylchlorothiophosphate left the fifth reaction compartment.

What is claimed is:

1. A continuous process for making 0,0-di-lower alkylchlorothiophosphate which comprises continuously mixing while stirring a solution of a sodium lower-alcoholate dissolved in a lower alcohol with phosphorous sulfochloride in the ratio of 2 to 2.3 moles of the alcoholate per mole of the phosphorous sulfochloride, said alcoholate solution being mixed with the phosphorous sulfochloride incrementally in from 3 to 8 increments with those increments mixed first being larger than those mixed later with the phosphorous sulfochloride, the temperature of the resulting mixture being maintained at 30°C. or less and the reaction time being limited to not more than 6 hours.

2. The process of claim 1 wherein the phosphorous sulfochloride is dissolved in an inert solvent therefor.

3. The process of claim 2 wherein the solvent is toluene or benzene.

* * * * *